US012060978B2

(12) United States Patent
Jones

(10) Patent No.: US 12,060,978 B2
(45) Date of Patent: Aug. 13, 2024

(54) LIGHTING SYSTEM FOR SIMULATING LIGHTED FRONDS ON LIVE PALM TREES THAT INCLUDES LIGHT WRAP

(71) Applicant: Charles Douglas Jones, Lexington, SC (US)

(72) Inventor: Charles Douglas Jones, Lexington, SC (US)

(73) Assignee: Celebration Illumination LLC, Newberry, SC (US)

( * ) Notice: Subject to any disclaimer, the term of this patent is extended or adjusted under 35 U.S.C. 154(b) by 0 days.

(21) Appl. No.: 18/163,471

(22) Filed: Feb. 2, 2023

(65) Prior Publication Data

US 2023/0250926 A1 Aug. 10, 2023

Related U.S. Application Data

(60) Provisional application No. 63/267,760, filed on Feb. 9, 2022.

(51) Int. Cl.
*F21S 4/15* (2016.01)
*F21W 121/00* (2006.01)

(52) U.S. Cl.
CPC ............ *F21S 4/15* (2016.01); *F21W 2121/00* (2013.01)

(58) Field of Classification Search
CPC .............................. F21W 2121/00; F21S 4/15
See application file for complete search history.

(56) References Cited

U.S. PATENT DOCUMENTS

| | | | | |
|---|---|---|---|---|
| 4,462,065 A * | 7/1984 | Rhodes | F21S 4/10 | 362/396 |
| 5,085,901 A | 2/1992 | Johnson et al. | | |
| 6,122,866 A | 9/2000 | Thomas et al. | | |
| 6,286,266 B1 | 9/2001 | Popowych et al. | | |
| 6,599,591 B1 | 7/2003 | Scott | | |
| 7,014,331 B2 | 3/2006 | Risch et al. | | |
| 7,052,156 B2 | 5/2006 | Primeau | | |
| 7,055,981 B2 | 6/2006 | Yao | | |
| 7,559,666 B2 | 7/2009 | Liu | | |
| 8,240,883 B2 * | 8/2012 | Barbieri | F21S 4/20 | 362/249.18 |
| 8,356,926 B1 * | 1/2013 | Sanders | F21S 4/15 | 362/652 |
| 8,376,584 B1 * | 2/2013 | Jenko | F21S 4/10 | 362/249.18 |
| 8,485,690 B1 * | 7/2013 | Garcia | F21V 17/007 | 362/396 |
| 8,684,551 B2 | 4/2014 | Alsaffar | | |
| 9,572,446 B2 | 2/2017 | Chen | | |
| 10,840,707 B2 | 11/2020 | Lyden | | |

(Continued)

*Primary Examiner* — Julie A Bannan

(74) *Attorney, Agent, or Firm* — Dunlap Bennett & Ludwig, PLLC

(57) ABSTRACT

A system for simulating palm fronds strewn with lights. The system may include an arcuate frame having a gap for facilitating mounting the arcuate frame to a trunk of a tree. The opposing ends of the arcuate that define the gap may include attachment points that can be interconnected by an attachment tie for cinching the arcuate frame around the trunk. The system may include simulated branches, each branch with pre-installed lighting, where an end portion of each branch are removably mountable to branch mounts disposed along the arcuate frame.

5 Claims, 4 Drawing Sheets

(56) References Cited

U.S. PATENT DOCUMENTS

| | | | |
|---|---|---|---|
| 11,353,176 B1 | 6/2022 | Chen | |
| 2005/0048226 A1 | 3/2005 | Gary et al. | |
| 2006/0164834 A1* | 7/2006 | Kao | A47G 33/06 362/249.01 |
| 2006/0245177 A1 | 11/2006 | Tsai | |
| 2019/0316743 A1 | 10/2019 | Planinsek et al. | |

* cited by examiner

LIGHTING SYSTEM FOR SIMULATING LIGHTED FRONDS ON LIVE PALM TREES THAT INCLUDES LIGHT WRAP

CROSS-REFERENCE TO RELATED APPLICATION

This application claims the benefit of priority of U.S. provisional application No. 63/267,760, filed Feb. 9, 2022, the contents of which are herein incorporated by reference.

BACKGROUND OF THE INVENTION

The present invention relates to lighting systems and, more particularly, an outdoor lighting system adapted to simulate lighted fronds on a live palm tree.

Trees are regularly decorated during holidays, celebrations, and festivals by wrapping the trunk of the tree with lights and into the branches of the tree—ala 'Christmas tree' style. When the tree is a palm tree, however, stringing the lights into the fragile fronds of the palm tree can cause damage to the fronds, and surface fronds may be armed with sharp spines that can injure installer. Moreover, because of the umbrella-shape, running lights through the fronds of a palm tree requires moving a ladder numerous times in order to reach every part of the frond. These numerous relocations of a ladder and reaching back into the fronds create many opportunities for a fall from the ladder or an injury by the sharp spines of the fronds. As a result, stringing lights through the fronds of a palm tree is seldom done, even though the result is very aesthetically pleasing.

Another currently practiced solution directs light into the existing fronds and is a very expensive solution. Other outdoor lighting systems the inventor is aware of are complex, have a high cost of production, and have the disadvantage of requiring a physical connection with the fronds at several points, which invites the above-mentioned risks. Some current solutions also require that the user have access to clear footing for the length of the fronds and for the perimeter of the tree to attach the lighting.

As can be seen, there is a need for an outdoor lighting system adapted to simulate lighted fronds on a palm tree.

SUMMARY OF THE INVENTION

The present invention is adapted to simulate fronds strewn with lights, without attaching anything directly to the living palm tree fronds.

The branches (fronds) may be made of a heavy gauge wire, or other resilient material, with a curvature to simulate that of the palm tree fronds. The branches can be of different lengths, but the standard would be approximately forty-five inches long in the curved section of the branch. Lights may be attached to these branches permanently during manufacturing. These can be strands of light or tube light, white, multi-colored, or a color of choice, LED or incandescent. These branches may end in two straight, parallel sections of about four inches on either side. These branch ends may be attached to hoops made of the same material as the branches. The hoops may be spaced about four inches apart one above the other and fastened together by tubes that would accept the branch end(s).

These branch mounting portions may have two tubes of the same length to accept the two straight sections for each branch. The hoops can have different numbers of branches spaced around the circumference of the hoop. The standard may be eight branches with a total of sixteen tubes with two tubes for each branch. The hoop may have an opening to allow it to open to place the present invention around the section of tree trunk just below the living fronds of the tree. The ends of the hoop opening may have rings so the hoops can be closed with fasteners around the trunk. The hoop does not have to be completely closed to allow for the various sizes of trunks and it can also be combined with other units for larger circumferences. The lights may be interconnected between the branches of that unit so that they can be plugged to additional units if desired and with a female electrical plug on the branch at the other end for that section to plug into light wraps and on to a source of electricity. Fasteners can be standard hardware, plastic, or metal zip ties.

The present invention embodies an arcuate mounting assembly for attaching to the top of a light wrap around the trunk of the palm tree. The device embodied in the present invention, colloquially known as the "Palm Tree Topper", simulates the fronds and it is illuminated and adapted to provide continuity with standard lighting systems wrapped around the trunk. In sum, the "Palm Tree Topper" can be safely and easily installed on palm trees in both residential and commercial conditions. The present invention can be placed on or attached to the tree without a ladder, only requiring that someone reach up the trunk or use a ladder placed against the truck—i.e., not requiring that the ladder be moved numerous times to attach lighting to the actual fronds. This can substantially reduce the possibility of a fall and makes for a safer, quicker installation.

The present invention can be used in conjunction with the lights that wrap the trunk or can be used as a standalone device. The present invention also contemplates providing a lighting wrap for the trunk. The simulated branches and the lighting wrap can share the same transformer, controller and remote and need only a single source of electricity. The present invention can be used in both residential and commercial situations.

In one aspect of the present invention, an apparatus for simulated fronds with lights, the apparatus includes the following: an arcuate frame having a gap defined by opposing ends of the arcuate frame; one or more attachment points provided along each opposing end; a plurality of branch mounts radially spaced apart along the arcuate frame; a plurality of branches, each branch having lights connected thereto, wherein an end of each branch is dimensioned to removably attach to one or the plurality of branch mounts.

In another aspect of the present invention the apparatus further includes wherein the gap is a circular arc that subtends an angle at the center of the arcuate frame that is between three-quarters and two radians; a cinching tie urging the opposing ends together, wherein the arcuate frame comprises two spaced apart hoops, wherein each branch mount comprises a pair of longitudinally joined tubes, wherein each branch has a curvature along a midportion that terminates a straight end dimensioned to operatively associate with the pair of longitudinally joined tubes, wherein the straight end comprises two straight members spaced apart by a cross bar, further including a mesh light wrap; and a power connection electrically connecting the lights of the plurality of branches and the mesh light wrap.

These and other features, aspects and advantages of the present invention will become better understood with reference to the following drawings, description, and claims.

DETAILED DESCRIPTION OF THE INVENTION

Figure 1:
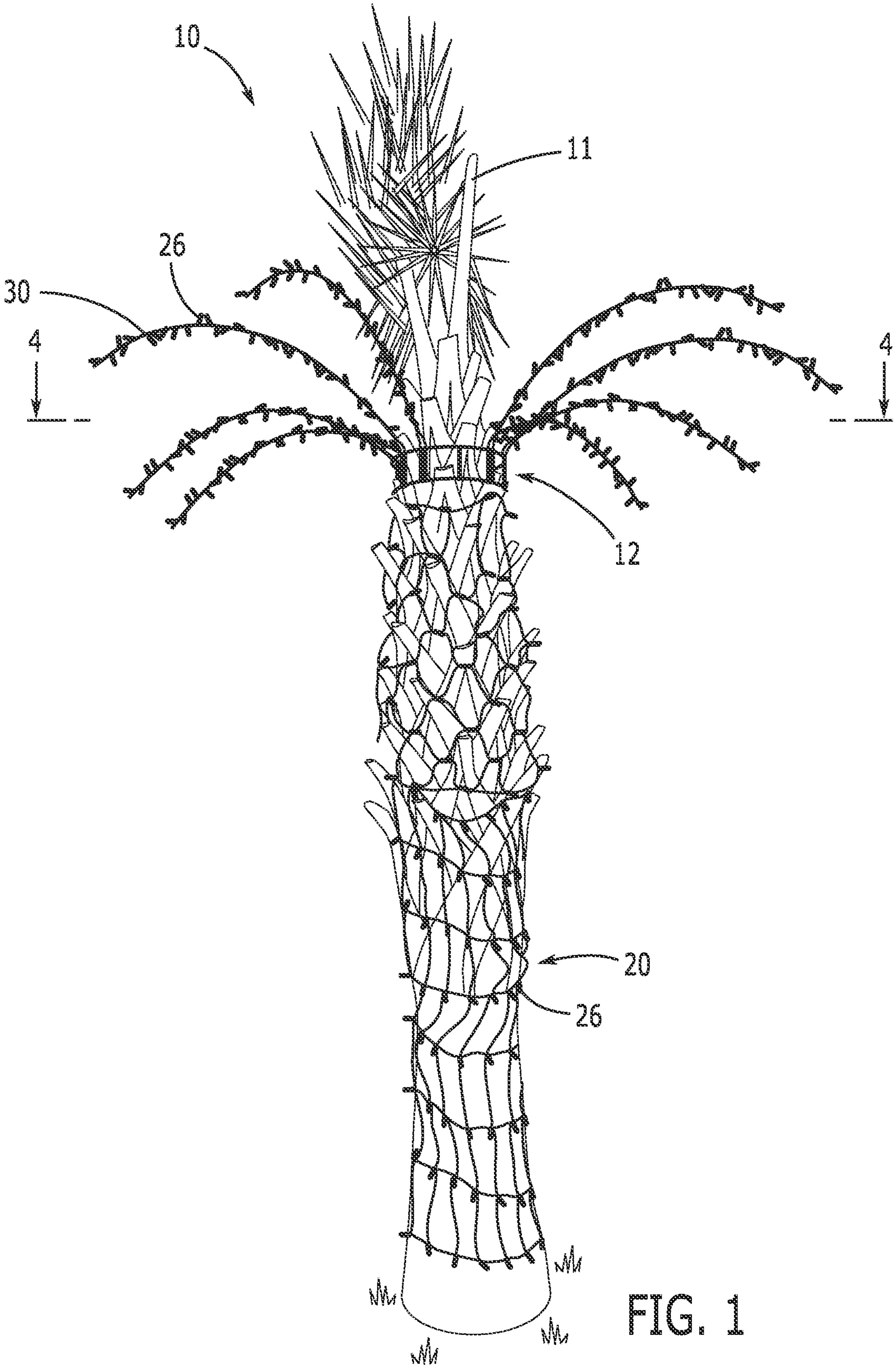
FIG. 1 is a perspective view of an exemplary embodiment of the present invention, shown in use.
Figure 2:
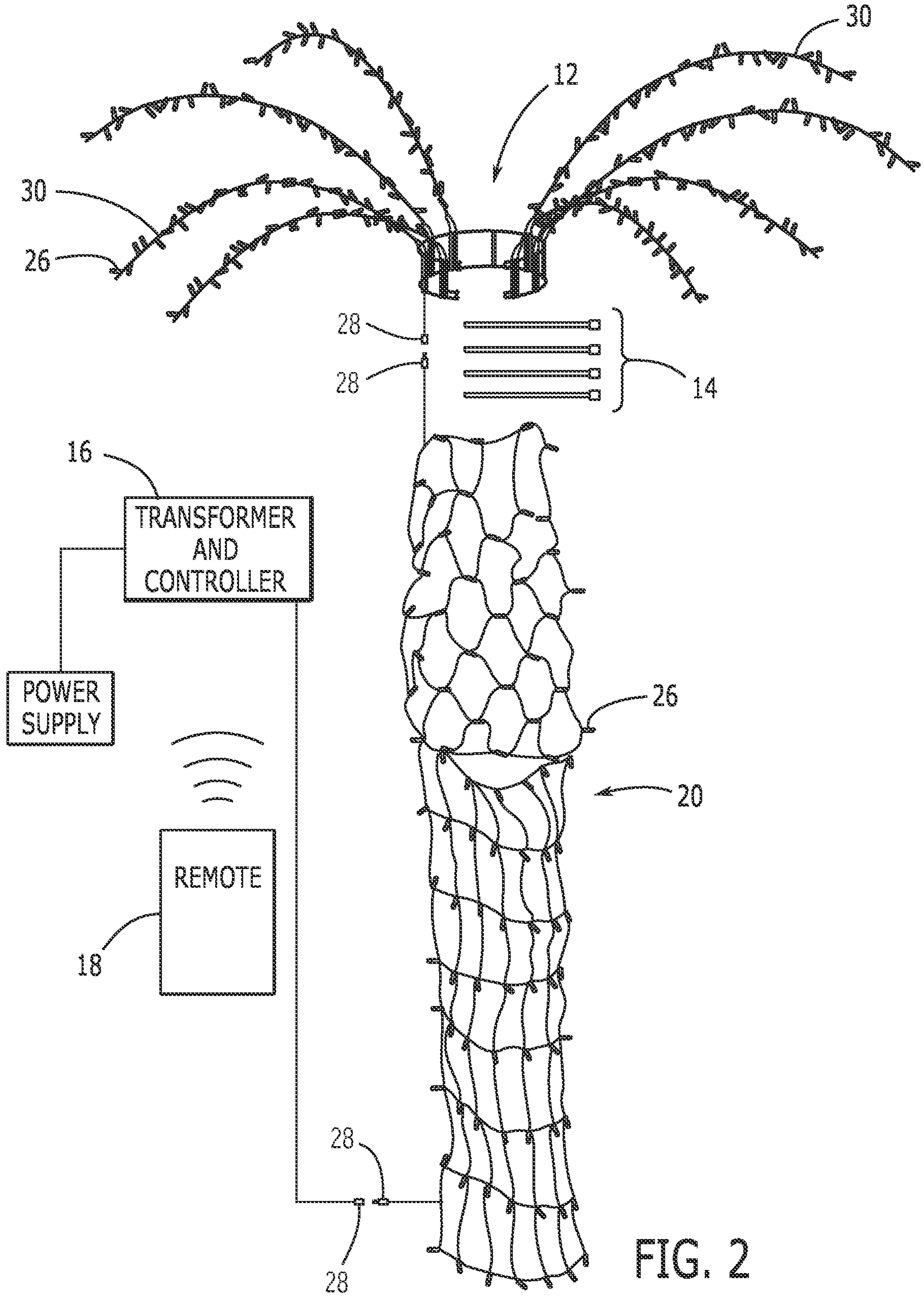
FIG. 2 is an exploded elevation view of an exemplary embodiment of the present invention, illustrating the power connections.
Figure 3:
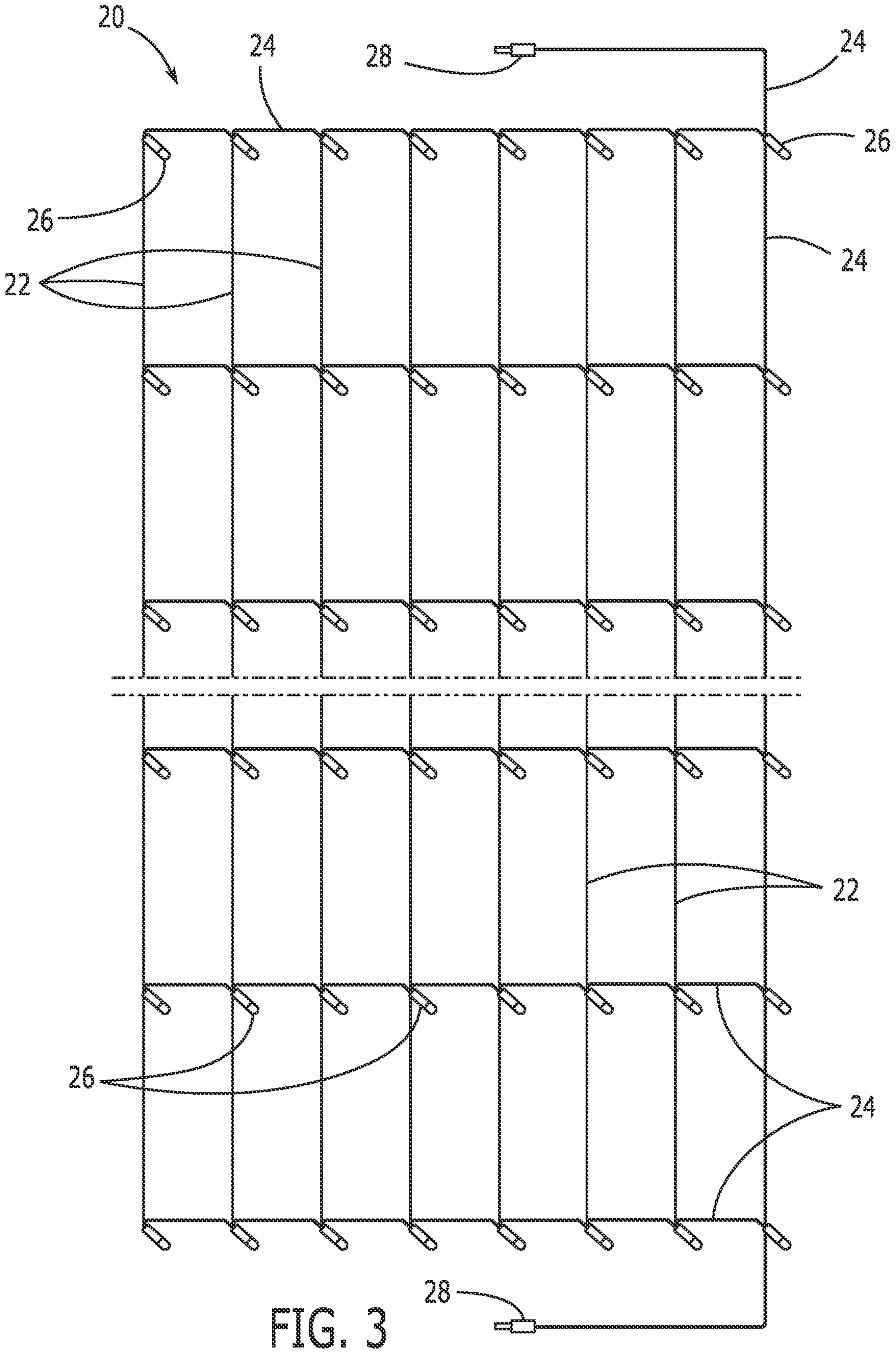
FIG. 3 is a schematic view of an exemplary embodiment of the present invention, detailing the light wrap 20.
Figure 4:
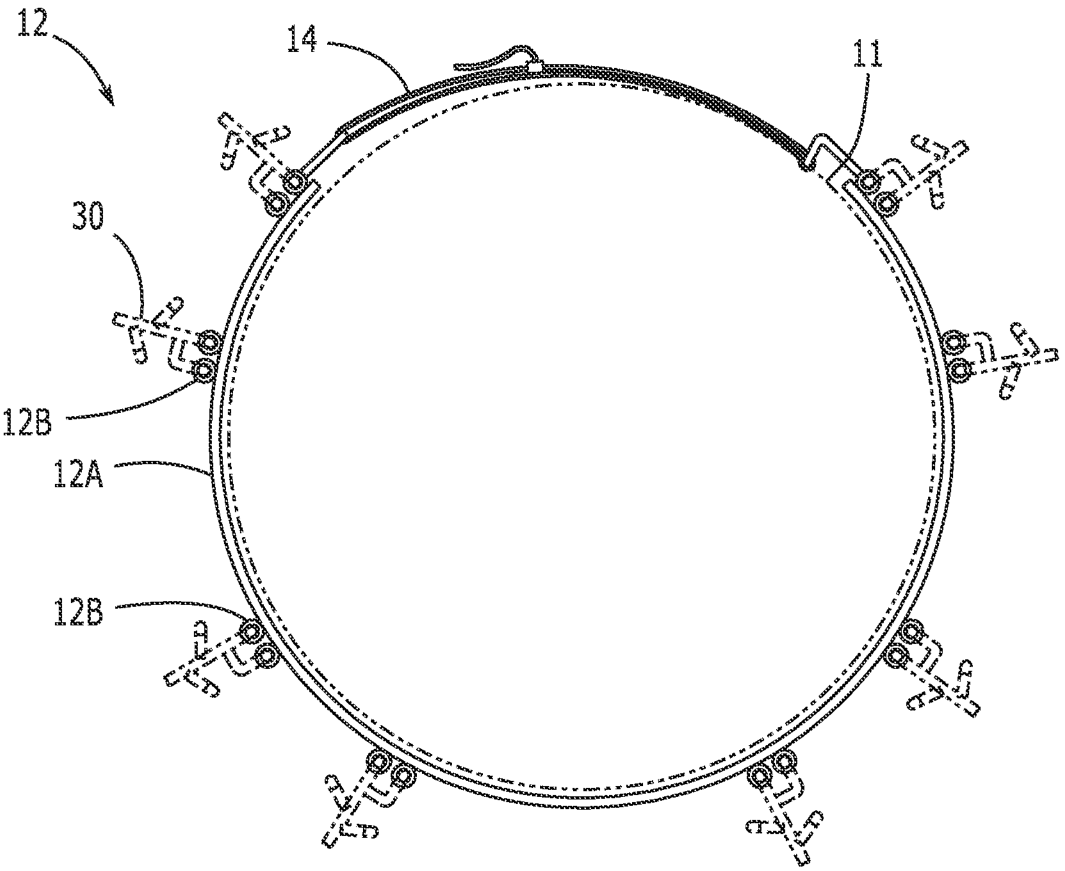
FIG. 4 is a detailed cross-sectional view of an exemplary embodiment of the arcuate frame 12 of the present invention, taken along line 4-4 in FIG. 1.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Referring now to FIGS. 1 through 5, the present invention may include an apparatus 10 and a method for decoratively lighting a tree 11. The apparatus 10 may provide a mounting assembly 12 and a plurality of simulated branches 30 with light elements 26. The light elements 26 can be strands of lights may be tube lights, white, multi-colored, or a color of choice, LED, or incandescent lights.

The mounting assembly 12 is dimensioned and adapted for cinching around different sizes of trunks, since the girth of the trunk varies from tree to tree. The mounting assembly 12 includes an arcuate frame 12A that forms an incomplete circle, leaving a gap 40, see FIG. 4, between opposing ends 42 of the arcuate frame 12A. The gap 40 may be associated with a circular arc that subtends an angle at the center of the circular arcuate frame 12A that is less than $\pi$ radians.

The opposing ends 42 of the arcuate frame 12A provide attachment points 44 (such as but not limited to hooks). As a result of the gap 42 and the attachment points 44 an attachment tie 14 can engage both opposing ends 42 so that the user can selectively cinch the opposing ends of the arcuate frame 12A together around a trunk. Accordingly, a user can utilize the gap 40 to get the arcuate frame 12A around the trunk, and then use the attachment tie 14 to belt strap the present invention securely around the trunk.

Figure 5:
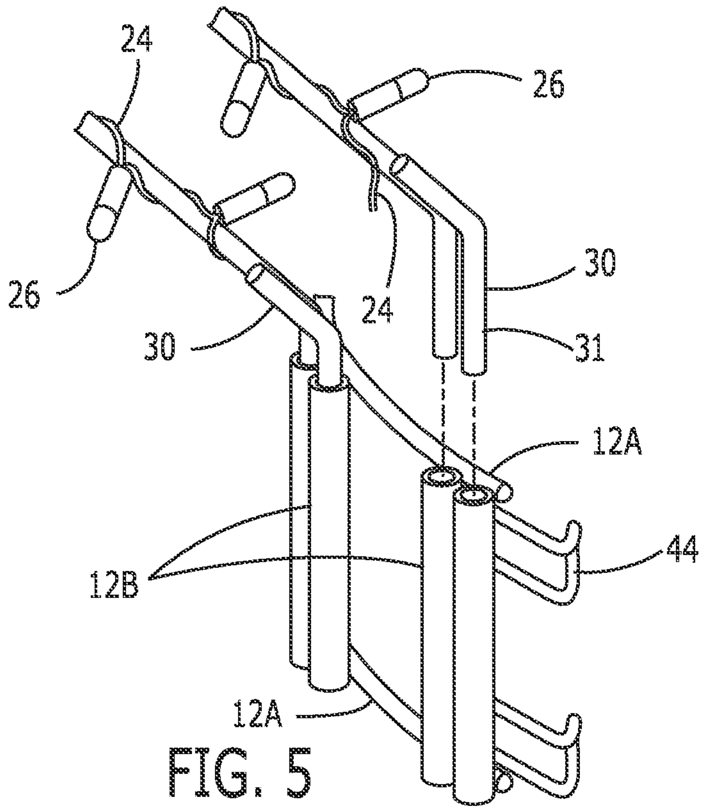
FIG. 5 is a detailed perspective view of an exemplary embodiment of the arcuate frame 12 of the present invention, illustrating mounting details.

The arcuate frame 12A may comprise two hoop rings, as illustrated in FIG. 5. A plurality of branch mounts 12B radially spaced apart along the arcuate frame 12A joins the spaced apart hoop rings, providing structural integrity and stability thereto. Each branch mount 12B may include two, longitudinally joined, sleeves for receiving an end of a simulated branch 30. In other words, each branch mount 12B may be two sleeves/tubes, a plurality of which are spaced around the perimeter of the arcuate frame 12A. The sleeves/tubes are sized to accept the ends of the simulated branches 30.

The simulated branches 30 may have a curvature to simulate the fronds of a palm tree. Along a central portion of the branch 30 may be a bend of approximately 115 degrees, terminating in a short straight end portion 31. This end section 31 may be dimensioned and adapted to slide into a sleeve/tube of the branch mount 12B. Accordingly, the end portion may include two spaced apart straight members transversely joined by a cross bar 29. The branches 30 may be marked with matching-colored paints, stickers, or some other matching identifier.

Once the apparatus 10 is assembled it can be placed on the tree trunk. This can be done by holding it above one's head with the gap 42 of the arcuate frame 12A facing the trunk. Then the user may spread the gap 42 onto the trunk. Then the user may walk to the other side of the tree 11 and move the apparatus 10 to the desired location on the trunk. If the user would like it to be higher on the trunk the user may choose to use a ladder to reach higher. Once it is at the desired height, possibly around nine feet, the user may fasten the ends of the apparatus 10 with the attachment ties 14, such as metal or plastic zip-ties or another cinching fastener.

Once the apparatus 10 is secured, a user may place a light wrap 20 on the trunk just below the apparatus 10. The light wrap 20 is a wrap net 22 or mesh of wires 24 electrically connecting a plurality lights 26.

The user may connect the rain proof connectors 28 between the apparatus and the tree-wrap 20. Then the user may attach the transformer and controller 16; then attach it to an electrical power source. Then all the lights 26 may be controlled with a remote 18. If necessary one or more additional apparatus 10 and light wraps 20 can share the same transformer/controller 16 and remote 18 on the same tree 11.

Once the user is ready to store the apparatus 10, they may reverse the above process step. The apparatus 10 and light wrap 20 may fit into the same 4 inches×16 inches×44 inches box in which it was received as a kit.

The apparatus 10 can be made from metal or plastic. If made from metal the structural components of the arcuate frame 12A and branches 30 can be manufactured in a metal fabrication facility with the capability to weld and work with heavy gauge wire.

In one embodiment, the arcuate frame 12A has two hoops one above the other attached to one another. The hoops may be approximately sixteen-inch diameter with a four-inch opening with hooks welded on one end and loops welded on the other ends of the hoops. The branch mounts 12B may be made from sixteen pieces of tubing arranged in eight pairs welded around the perimeter. The tubes may be approximately four inches long and are welded to the outsides of the hoops.

The branches 30 may be bent to simulate the curvature of a palm tree frond. The branches can be manufactured to various lengths. The branches 30 may be made with a forty-five-inch piece of heavy gauge wire, possibly 11.5 gauge. A one-inch section will be bent at approximately a 115-degree angle on one end. Pieces of the same heavy wire will be welded to the outside opposite sides of the one-inch section. These straight pieces may be four inches long. This straight section of the branch will be inserted into the tubes 12B. The branches 30 may have the lighting 26 zip-tied to them during manufacturing. The lighting 26 may continue from one branch to the next. The branches 30 will be arranged and inserted into the tubes to their corresponding locations on the arcuate frame 12A.

The branches 30 may be arranged in a fashion with corresponding matching identifiers, such as paint with matching colors on the branches and tubes. This could be done with a range of matching identifiers. All parts may be interchangeable with other units. The apparatus 10 and light wraps 20 can be placed on any kind of tree or post to simulate the appearance of a palm tree.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term “aligned” means parallel, substantially parallel, or forming an angle of less than 35.0 degrees. For purposes of this disclosure, the term “transverse” means perpendicular, substantially perpendicular, or forming an angle between 55.0 and 125.0 degrees. Also, for purposes of this disclosure, the term “length” means the longest dimension of an object. Also, for purposes of this disclosure, the term “width” means the dimension of an object from side to side. For the purposes of this disclosure, the term “above” generally means superjacent, substantially superjacent, or higher than another object although not directly overlying the object. Further, for purposes of this disclosure, the term “mechanical communication” generally refers to components being in direct physical contact with each other or being in indirect physical contact with each other where movement of one component affect the position of the other.

The use of any and all examples, or exemplary language (“e.g.,” “such as,” or “the like”) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as “first,” “second,” “top,” “bottom,” “up,” “down,” and “the like”, are words of convenience and are not to be construed as limiting terms unless specifically stated to the contrary.

What is claimed is:

1. An apparatus for simulated fronds with lights, the apparatus comprising:

an arcuate frame having a gap defined by opposing ends of the arcuate frame, wherein the gap is a circular arc that subtends an angle at the center of the arcuate frame that is between three-quarters and two radians, and wherein the arcuate frame comprises two spaced apart hoops;

a cinching tie urging the opposing ends together;

one or more attachment points provided along each opposing end;

a plurality of branch mounts radially spaced apart along the arcuate frame, wherein each branch mount comprises a pair of longitudinally joined tubes; and a plurality of branches, each branch having lights connected thereto, wherein an end of each branch is dimensioned to removably attach to one or the plurality of branch mounts.

2. The apparatus of claim 1, wherein each branch has a curvature along a midportion that terminates a straight end dimensioned to operatively associate with the pair of longitudinally joined tubes.

3. The apparatus of claim 2, wherein the straight end comprises two straight members spaced apart by a cross bar.

4. The apparatus of claim 3, further comprising a mesh light wrap.

5. The apparatus of claim 4, further comprising a power connection electrically connecting the lights of the plurality of branches and the mesh light wrap.

* * * * *